Sept. 29, 1931. C. B. COLLOM ET AL 1,825,179
GRAPPLING TONGS
Filed Dec. 2, 1929
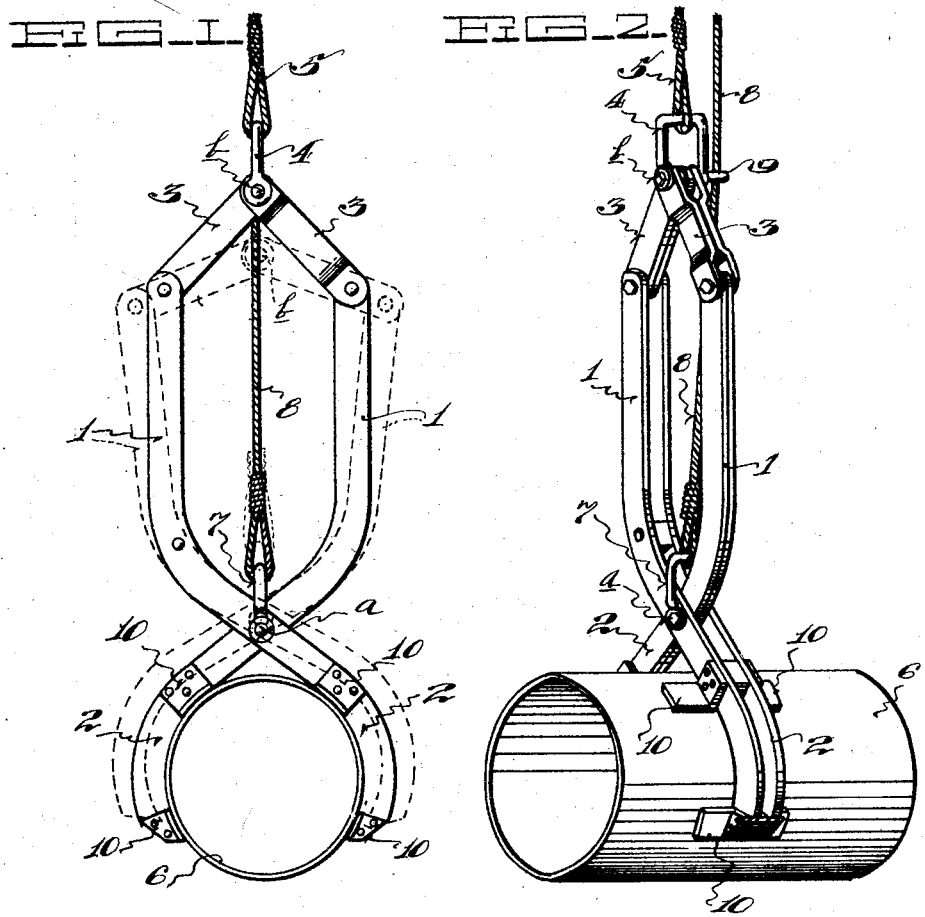
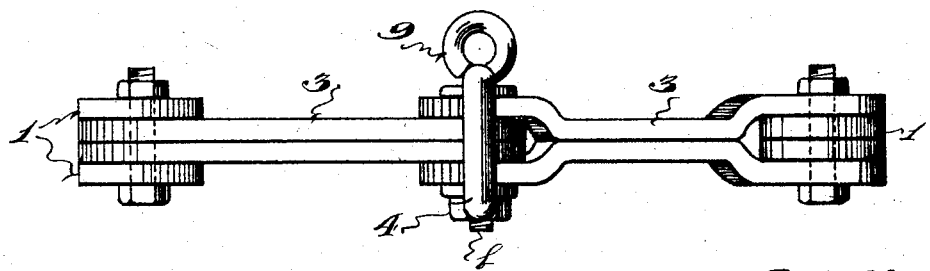
Clarence B. Collom
Dwight Horton
INVENTOR.
BY Ernest A. Wood
ATTORNEY.

Patented Sept. 29, 1931

1,825,179

UNITED STATES PATENT OFFICE

CLARENCE B. COLLOM AND DWIGHT HORTON, OF DALLAS, TEXAS, ASSIGNORS OF FIFTY PER CENT TO W. L. THORNTON AND F. W. BARTLETT, BOTH OF DALLAS, TEXAS

GRAPPLING TONGS

Application filed December 2, 1929. Serial No. 410,951.

This invention relates to handling and hoist line implements and has particular reference to grappling tongs for handling heavy objects such as pipe sections, boilers, tanks and the like, and capable of operation from the end of a cable attached to a crane excavating machine, or drag line and its principal object resides in the provision of a device calculated to facilitate the handling of bulky, unwieldy objects, such as mentioned above, and eliminate much of the time and effort ordinarily requisite in displacing such objects.

Another object of the invention is manifest in the provision of a device for the purposes set forth embodying a novel arrangement of parts cooperating to automatically engage an object to be removed and secure the same until such time as the object is deposited at the desired point when it is automatically released, doing away with the necessity of manual effort other than to guide the device to the point of securement on the object to be handled.

Still another object of the invention resides in the provision of an apparatus, simple in construction and having few working parts, yet capable of many uses such as have been set out in the foregoing to expedite the work incident to the laying of heavy pipe lines, loading and unloading heavy pipe sections and boilers, setting boilers and the performance of many other accomplishments ordinarily requiring the use of cables and considerable manual effort.

The foregoing and many other objects will become manifest as the description proceeds, taken in connection with the accompanying drawings wherein:—

Figure 1 is an elevational view of the invention gripping a pipe section and showing in dotted lines, the relative positions of the tongs when opened.

Figure 2 is a perspective elevational view showing the tongs gripping a pipe section and position of the operating cable, and Figure 3 is a plan view of the device showing the top clevis and eye bolt guide through which the operating cable works.

The ordinary method of raising or otherwise handling pipe sections of large proportions, and boilers and the like, usually consists in placing a cable around the approximate center of the object to be handled and securing the same so that the said object being handled is balanced. This method, at its best, is not only unsatisfactory from the standpoint of efficiency but is extremely dangerous both to human life and to property. Unless the object being handled is balanced in the sling prepared in the cable arranged around it, one end will drop and allow the object to drop to the ground with possible injury to men and damage to property. It will presently be shown that accidents would be greatly minimized by the use of the apparatus herein described.

Accordingly, the invention comprises, primarily two S-shaped members or elements, opposingly pivoted at $a$, so as to define a substantially circular gripping area between their lower ends 2, as shown in Figures 1 and 2. Pivoted to the upper ends of the members 1 are provided connecting links 3, the latter being pivoted together in the manner shown in Figures 1 and 2 at $b$ to which is attached a clevis 4 to which a cable 5 is affixed for lifting the device.

As will be seen in the illustrations, the device is so constructed that when suspended at the end of the cable 5, the result will be to urge the upper ends of the members 1 toward each other consequently causing the lower ends 2 to close upon an object 6 to be raised and grasp the latter firmly, as shown in Figure 1.

A clevis 7 is provided at the pivot point $a$ to which is also attached a cable 8 which functions to open the device when it is desired to engage an object for removal. The cable 8 is secured to the clevis 7 and extends upward through an eye bolt 9, which also functions at the pivot $b$, and to the operator, who may open or close the device at will by its manipulation. It is obvious that when the tension in the cable 5 has been slackened, an upward action on the pivot $a$ will cause the members to spread by their own weight, at the upper ends whereupon the lower ends will release the object 6 in the manner shown in dotted lines in Figure 1.

In order that a positive grip may be had within the grappling area of the tongs, a multiplicity of projections 10 are provided to prevent the object 6 from slipping out or being displaced laterally when the tongs are not secured in the approximate gravity center of the object to be lifted causing the latter to become unbalanced at one end. These projections are preferably of a type of angle bar such as shown in Figures 1 and 2 of the drawings.

In operation therefore, when it is desired to use the device for handling pipe sections, for example, a crane or similar machine is used having a cable 5 to which the apparatus is attached in the manner illustrated in Figures 1 and 2. The device is lowered upon the object 6 to be removed whereupon the cable 8 is pulled upward to cause the tongs 2 to open to allow them to pass around the object. At this point it is only necessary to release the tension on the cable 8 and allow the tongs 2 to rest upon the object 6 and tighten the cable 5. The obvious result is the pulling in of the toggle joints of the links 3 to tighten the grip of the tongs upon the object, whereupon the latter may be lifted and moved.

Though the invention has been described with great particularity, the details of the embodiment of the invention herein shown are not to be construed as being limited thereto, as changes in arrangement and substitution of equivalents may be made by those skilled in the art without departing from the invention as defined in the appended claims.

What is claimed is:

1. Grappling tongs including substantially S-shaped members, pivotally joined together in reverse relationship for scissor-like movement, the lower ends of which are curved on the same plane as the upper ends thereof to engage cylindrical objects transversely, the said upper ends being relatively parallel in normal position and linked together at their tops, providing a central pivot in alinement with the pivotal connection between said members, a loop at said central pivot to receive a cable, an eye adjacent said loop to receive another cable and means at the pivotal connection between said members to receive the end of said latter cable.

2. Grappling tongs including substantially S-shaped members arranged in pairs and joined together for pivotal movement whereby the lower ends of said members will conformably receive cylindrical objects transversely, shoes arranged at spaced intervals on the lower ends of said members to stabilize an object embraced by said lower ends, means engageable at a point adjacent the pivotal point of said members to receive a cable, pivotally connected means joining the upper ends of said members and having a loop adjacent thereto for receiving another cable and a guide member adjacent said loop for receiving said first cable.

In testimony whereof we affix our signatures.

CLARENCE B. COLLOM.
DWIGHT HORTON.